United States Patent [19]

Usher

[11] Patent Number: 4,855,416

[45] Date of Patent: Aug. 8, 1989

[54] METHOD FOR THE MANUFACTURE OF DEXTRAN SULFATE AND SALTS THEREOF

[75] Inventor: Thomas C. Usher, Nassau, The Bahamas

[73] Assignee: Polydex Pharmaceuticals, Ltd, Nassau, The Bahamas

[21] Appl. No.: 75,644

[22] Filed: Jul. 20, 1987

Related U.S. Application Data

[63] Continuation-in-part of Ser. No. 516,640, Jul. 25, 1983, abandoned.

[51] Int. Cl.$^4$ .............................................. C08B 37/02
[52] U.S. Cl. .................................... 536/112; 536/122
[58] Field of Search .................................. 536/51, 112

[56] References Cited

U.S. PATENT DOCUMENTS 3,141,014  7/1964  Morii et al. ........................ 424/180

OTHER PUBLICATIONS

Gilbert Sulfonavion & Related Reactions (1965) p. 17.

*Primary Examiner*—Alan Siegel
*Attorney, Agent, or Firm*—I. Louis Wolk

[57] ABSTRACT

A method for the preparation of dextran sulfate and salts thereof which comprises first forming a complex between sulfur trioxide and formamide at a controlled temperature between 15°–40° C. in the presence of dry nitrogen gas and thereafter reacting said complex with dextran at a controlled temperature between 25°–55° C.

5 Claims, No Drawings

METHOD FOR THE MANUFACTURE OF DEXTRAN SULFATE AND SALTS THEREOF

This application is a continuation-in-part of applicant's application, Ser. No. 516,640 filed July 25, 1983 now abandoned.

BACKGROUND OF THE INVENTION

Dextran sulfate is a product obtained by the sulfation of dextran and since as the free ester, it is strongly acidic and tends to decompose it is generally converted during or after production to its corresponding salt by neutralization, most often to its sodium salt.

The salts of dextran sulfate, particularly its sodium salt, have been found to be useful as an anti-coagulant, as an anti-lipemic agent, an anti-ulcer agent, and numerous other uses. Dextran sulfate has also demonstrated anti-viral activity with respect to certain viral infections such as poliomyelitis, sheep scrapie, and human immunodeficiency virus (HIV). It has most often been manufactured by sulfation of dextran with chlorsulfonic acid in pyridine, i.e. C. R. Ricketts, Biochm J. 51 210-133 (1952), by using concentrated sulfuric acid, at very low temperatures, U.S. Pat. No. 3,498,972, or by the use of chlorsulfonic acid in the presence of formamide at temperatures below 10° C.. U.S. Pat. No. 3,141,014, etc.

Such methods result in products which are impure and discolored, and possibly toxic, due largely to depolymerization of dextran during the reaction, or require slow and costly procedures, or result in very low yield.

For example, the use of concentrated sulfuric acid which requires very low temperatures, is inefficient in production scale due to cooling requirements and difficulty of control since even a slight rise in temperatures may cause degradation of the dextran. Similarly, with the use of chlorsulfonic acid and pyridine, separation of the pyridine from the reaction product is carried out at a high pH which produces depolymerization of the dextran and results in an impure and discolored product, which in turn requires much further purification, and results in reduction in yield.

In the process described in U.S. Pat. No. 3,141,014 referred to above, the inventors point out the disadvantages involved in the use of pyridine as a solvent, opting instead to utilize formamide as a solvent for dextran followed by dropwise addition of chlorsulfonic acid alone or admixed with formamide. In order to achieve the proper degree of esterification and to avoid excessive polymerization of the resultant dextran sulfate the inventors carry out the greater part of the esterification reaction at temperatures in the range of 10° C. and during the final stages at temperatures which can be raised to 20°-35° C.

Experimental procedures carried out by applicant confirmed the fact that unless temperatures were controlled in the manner set forth in U.S. Pat. No. 3,141,014, that process could not be effectively carried out to obtain products in the yields set forth. The necessity of so limiting the reaction temperatures clearly affected the yields obtainable and on the other hand were necessary in order to minimize decomposition to reactants which otherwise tended to occur.

Applicant has also found that the use of chlorsulfonic acid as a sulfating agent has the disadvantage that chlorides are formed as impurities which require removal during separation and purification procedures.

DESCRIPTION OF THE INVENTION

Applicant has discovered that dextran sulfate may be produced in a highly efficient manner at moderately elevated temperatures above room temperature with increased yield and a high degree of purity by reacting dextran with a complex formed by the association of liquid sulfur trioxide with formamide, followed by reaction of the said complex with dextran. The reaction product may then be neutralized to produce the desired salt and obtained as a white granular precipitate after suitable washing and purification procedures. In most cases neutralization may be with NaOH to obtain dextran sulfate but other alkali or alkaline earth metal salts may be similarly obtained.

In carrying out the initial stage of the procedure to form the complex between $SO_3$ and formamide it has been found essential to carry out the reaction in an inert atmosphere at a temperature below about 40° C. The inert atmosphere is provided by passing dry nitrogen gas over the reaction mixture. Since the complex is unstable at elevated temperatures above room temperatures with the generation of HCN, it is thus necessary to utilize the dry inert gas and lower temperatures in order to preserve stability and avoid contamination with moisture. Although an upper temperature as high as 40° C. is feasible, lower temperatures are generally preferred and for convenience and practicality temperatures within the range of 15° C.–40° C. are preferred. The complex is generally formed in solution or admixture with a small excess of formamide.

Following the formation of the $SO_3$ formamide complex as described above, the initial stage reaction mixture is reacted with dextran by addition to and mixing therewith while maintaining the temperature of the reaction mixture at a temperature between 25° C. and 55° C. At temperatures below this range the rate and degree of sulfation has been too slow to be commercially practicable and at temperatures above this range the rate and degree of sulfation has been found to produce an excessive amount of discoloration of product, depolymerization of dextran, decreased yields and increased problems of purification following the reaction. The reaction may then be neutralized following or during the reaction to produce the desired salt and obtained as a white granular product after suitable purification procedures.

The dextran used as a starting material my have any desired molecular weight depending upon the ultimate desired use for the dextran sulfate. For example, M.W. of 3000 has been used as a heparin substitute, M.W. 7000 for use an anti-lipemic compound, M.W. 40,000 as an anti-ulcer compound, and higher molecular weights for the production of dextran sulfate having other biochemical and biological utility. In general, dextran or hydrogenated dextran in the molecular weight range of about 2,000 to 1,000,000 may be converted to useful sulfates by the method of this present invention.

Hydrogenated dextran has been found to produce sulfates having improved purity and color. These are obtained by reduction of dextrans with hydrogen as by using sodium borohydride by methods described in U.S. Pat. Nos. 3,022,221 or 3,234,309, etc.

The sulfation may be carried out to produce any desired sulfur content. For example, as a lipolytic compound, a sulfur content of 2–13% by weight has been found desirable (U.S. Pat. No. 3,141,010). For the treatment of peptic ulcers, dextran sulfate having at least 13% sulfur has been found to be useful (U.S. Pat. No. 3,487,150). For most other cases, dextran sulfate having a sulfur content of 15–20% has been found suitable. The term "dextran sulfate" as used herein also includes the hydrogenated form of dextran known as hydrodextran sulfate.

Attention has been directed to a reference in the text book by Gilbert, "Sulfonation and Related Reactions," Krieger Publishing, 1965, in which Gilbert refers to the formation of a sulfur trioxide formamide complex by reacting chlorsulfonic acid with formamide. This in turn is based upon a description of this reaction in "Houben-Weyl-Methoden der Organischen Chemie—Vol. 14/2, 1963, pages 903–904." As stated therein, upon warming of the reaction HCN is liberated and when used to sulfate amylose the resultant product is "somewhat unstable." This reaction is then compared with sulfation with chlorsulfonic acid pyridine as being an apparently more favorable reaction since HCN is not liberated and various degrees of substitution may be obtained using various proportions of chlorsulfonic acid. This is obviously considered as a more feasible and desirable reaction and the description of the $SO_3$-formamide complex as being formed from sulfonic acid and its attempted use in sulfation of amylose appears to be referred to only as a scientific observation. There is no indication that this complex is the same as that which is formed by applicant in direct reaction with formamide, and the results obtained by applicant would indicate otherwise.

The following example illustrates the method of the invention.

EXAMPLE I

To 700 ml. formamide in a flask surrounded by an ice bath was added slowly with stirring 170 ml. of stabilized liquid $SO_3$ while passing dry nitrogen gently over the reaction mixture and keeping the temperature within the range of 25 40° C. until the reaction is complete.

The mixture was then transferred to a small reaction vessel and 200 grams of dextran (M.W. 20,000) was added with stirring. An additional 200 ml. of formamide was added with stirring and the mixture allowed to stand for 1 hour at room temperature (27° C.) then heated gently to 50° C. and allowed to stand for another hour. Sufficient de ionized water was then added to bring the volume to the 1750 ml. and the pH was adjusted to 6.5 with 6N. NaOh.

To this mixture was added 9 liters of isopropanol and the resulting syrupy precipitate was allowed to settle and the supernatant liquid was decanted.

The syrupy precipitate was dissolved in 750 ml. of deionized water. The addition of 8 liters of methanol thereto then resulted in the formation of a white precipitate. The supernatant liquid was then decanted and the precipitate was washed with 10 liters of methanol, filtered, and the solid washed on the filter with methanol. The wet solid was oven dried at 37° C.

The yield was 550 grams of white granular sodium dextran sulfate with the following properties:

pH 1% solution=5.2
Free $SO_4$—not detectable
Sp. Viscosity 1% in 1M. NcCl at 25° C.-0.087
Ash: 42.9%
S: 17.4%

EXAMPLE II

To 700 ml. formamide cooled in an ice bath was added 170 ml. liquid $SO_3$ while passing dry nitrogen gas over the reaction mixture. The temperature was maintained between 35° C. and 40° C. until this reaction was completed.

The resulting mixture was then transferred to a reaction vessel and 200 grams of hydrogenated dextran M.W. 4000 were added with stirring. 200 ml. formamide was stirred into the mixture which was gently heated to 52° C. and maintained at that temperature until the reaction was completed, then allowed to cool with stirring.

After 1½ hours the solution was neutralized with concentrated NaOH in a cold water bath to a pH of 6.6, and then diluted to 2500 ml. with deionized water. Approximately 5 liters of isopropanol were then mixed into the solution to obtain a syrupy precipitate comprising sodium hydrodextran sulfate. The supernatant liquid was decanted and the precipitate redissolved in one liter of de-ionized water and then reprecipitated with the addition of 5 liters of isopropanol. The resulting precipitate was again redissolved in one liter of deionized water and the solution was added to 7 liters of methanol with vigorous mixing. The powdery white precipitate of purified sodium hydrodextran sulfate was separated with a yield of 360 grams. The sulfur content was 19.2%.

EXAMPLE III 170 ml. liquid $SO_3$ was added with stirring to 700 ml. formamide cooled in an ice bath keeping temperature below 20°–30° C. to complete the reaction. A stream of dry nitrogen gas was maintained over the reaction mixture. The mixture was then transferred to a reaction vessel and 200 gr. dextran, M.W. 40,000, added with stirring. 200 ml. formamide was then added and mixing continued for 2 hours with gentle stirring and heating to 55° C. The mixture was then diluted 2000 ml. with deionized water and neutralized with concentrated NaOH to a pH of 6.5 with further dilution to about 4 liters.

The solution was then treated with the gradual addition, with stirring, of 15 liters of isopropanol to obtain a syrupy precipitate comprising sodium dextran sulfate which was then separated and redissolved in 1500 ml. of $H_2O$. This solution was then treated with 4 liters of methanol and a solid white precipitate of sodium dextran sulfate (M.W. approximately 40,000) was recovered. After washing and drying, the yield was found to be 470 grams.

The product was found to have a sulfur content of 15.5%.

EXAMPLE IV 170 ml. liquid $SO_3$ was added to 700 ml. formamide in an ice bath keeping temperature between 35°–40° C. until the reaction was completed. A stream of dry nitrogen gas was passed over the reaction mixture during the reaction. The mixture was then transferred to a reaction vessel and 200 gr. dextran, M.W. 500,000, was added with stirring. 200 ml. formamide was then also added and the temperature gradually raised to 50° C. and maintained at that temperature for ½ hour. The resulting viscous mass was then dissolved in de-ionized $H_2O$ to approximately 17 liters neutralized with concentrated NaOH to a pH of 7.5. This solution was then treated with 7½ liters of isopropanol to form a pasty white precipitate, which was redissolved in deionized H₂O and reprecipitated with about 6 liters of methanol. The precipitate was then washed three times with methanol and dried. A fine white powder was obtained which was sodium dextran sulfate, M.W. about 500,000 and with a sulfur content of 17.3%. The yield was 360 grams.

For comparison purposes applicant proceeded to carry out a series of experiments in which he substantially followed the procedure set forth in Example 1 of U.S. Pat. No. 3,141,014 except that dry nitrogen gas was not used during the initial stage of the reaction during addition of chlorsulfonic acid to formamide and by using more elevated temperatures within the range found to be desirable by applicant. The following results were obtained:

Experiment—A 35 ml. formamide cooled to 2° C., then 8 ml. chlorsulfonic acid added dropwise while maintaining temperature below 20° C. When reaction is complete, temperature was raised to 37° C. and 5 grams of dextran were added very slowly with mixing. The temperature was then allowed to rise slightly and the reaction maintained between 43°–45° C. for 3 hours. The reaction mixture was then dissolved in water and the pH was adjusted to about 6.5 after which a small amount of precipitate was obtained by adding methanol. After successive redissolution, washing and precipitation followed by drying, the product was found to contain a high amount of free sulfate indicating degradation and an unsatisfactory product.

Experiment—B

The procedure followed was similar to A except that the reaction temperature after addition of dextran was maintained between 30°–32° C. for 4 hours. After dissolution in water and adjusting the pH to 6.5, the product was precipitated with methanol. After redissolution and two precipitations the product was dried under vacuum and examined. The product yield was 19.2% which is very low, was discolored and contained a considerable amount of free sulfate.

Experiment—C

The procedure described in experiment B was followed except that the dextran sulfation reaction was allowed to proceed at about 55° C. for 3 hours. The product was dissolved in water and the pH was attempted to be adjusted but at a pH of 3.4 a colloidal suspension resulted which could not be dissolved by the addition of additional water. The product could not be precipitated by the addition of methanol and the batch was discarded.

These results indicate that applicant's process and results are substantially different and dissimilar from that described by the patent referred to. Despite the higher temperatures utilized, applicant's yield in the examples described ranged from 180–275 grams/100 grams of starting material compared with yields of 30–110 grams/100 shown in the Pat. No. 3,141,014. In addition, applicant was able to obtain a fine white product free from discoloration with a much simpler recovery procedure.

I claim:

1. The method of manufacturing dextran sulfate which comprises forming a complex between $SO_3$ and formamide by reacting liquid $SO_3$ and formamide at a temperature between about 15°–40° C. in an atmosphere of dry nitrogen gas and forming a solution of the complex in formamide, then mixing a selected dextran polymer to be sulfated with said $SO_3$ formamide complex solution at a temperature between about 25°–55° C. until sulfation is completed.

2. The method according to claim 1 wherein the reaction mixture is diluted with water and reacted with an alkali to obtain the corresponding salt of dextran sulfate followed by precipitation and purification to obtain the final product.

3. The method according to claim 1 wherein the reaction mixture is diluted with water and reacted with sodium hydroxide followed by precipitation of sodium dextran sulfate therefrom.

4. The method according to claim 1 wherein the dextran has a molecular weight between 3000 and 1,000,000 and the sulfur content of the dextran sulfate obtained is between about 15–20%.

5. The method according to claim 1 wherein the dextran has been preliminarily hydrogenated.

* * * * *